(12) United States Patent
Watz et al.

(10) Patent No.: US 11,473,676 B2
(45) Date of Patent: Oct. 18, 2022

(54) BRAKE TRANSMISSION SHIFT INTERLOCK INHIBIT PIN POSITION DETECTION

(71) Applicant: Steering Solutions IP Holding Corporation, Baginaw, MI (US)

(72) Inventors: Christopher F. Watz, Bay City, MI (US); Michael C. Vermeersch, Flushing, MI (US); Jason L. Myers, Mt. Morris, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 189 days.

(21) Appl. No.: 16/919,673

(22) Filed: Jul. 2, 2020

(65) Prior Publication Data

US 2022/0003311 A1 Jan. 6, 2022

(51) Int. Cl.
*F16H 61/22* (2006.01)
*F16H 59/54* (2006.01)
*G01D 5/14* (2006.01)
*B60K 20/06* (2006.01)

(52) U.S. Cl.
CPC ............. *F16H 61/22* (2013.01); *B60K 20/06* (2013.01); *F16H 59/54* (2013.01); *G01D 5/145* (2013.01); *F16H 2061/223* (2013.01)

(58) Field of Classification Search
None
See application file for complete search history.

(56) References Cited

U.S. PATENT DOCUMENTS

| | | | | |
|---|---|---|---|---|
| 6,526,928 B2* | 3/2003 | Bauer | ...................... | F01L 9/20 |
| | | | | 123/90.11 |
| 2016/0153552 A1* | 6/2016 | Yoon | ...................... | F16H 61/32 |
| | | | | 701/62 |
| 2017/0133138 A1* | 5/2017 | Bye | ........................ | H01F 7/1615 |
| 2018/0223990 A1* | 8/2018 | Shogren | ................. | F16H 61/22 |
| 2019/0128406 A1* | 5/2019 | Kim | .................... | F16H 61/0021 |
| 2020/0066069 A1* | 2/2020 | Kapoor | .................. | G07C 5/085 |

* cited by examiner

Primary Examiner — Timothy Hannon
(74) Attorney, Agent, or Firm — Dickinson Wright PLLC

(57) ABSTRACT

A steering column assembly includes a jacket assembly. The steering column assembly also includes a transmission shift assembly operatively connected to the jacket assembly. The steering column assembly further includes a brake transmission shift interlock (BTSI) device comprising an inhibitor pin translatable between an extended position and a retracted position, the inhibitor pin preventing shifting of the transmission shift assembly out of a PARK position when the inhibitor pin is in the extended position. The steering column assembly yet further includes an inhibitor pin monitoring system. The inhibitor pin monitoring system includes a sensor operatively coupled to a stationary portion of the BTSI device, relative to the inhibitor pin. The inhibitor pin monitoring system also includes a magnetic ring operatively fixed coupled to the inhibitor pin, the sensor detecting when the inhibitor pin is in the extended position.

15 Claims, 3 Drawing Sheets

BRAKE TRANSMISSION SHIFT INTERLOCK INHIBIT PIN POSITION DETECTION

BACKGROUND

Vehicles are provided with a shift system that is operable to select or shift gears of a vehicle transmission. The shift system may be mounted to a vehicle steering column and is operatively connected to the vehicle transmission through a control mechanism.

Brake transmission shift interlock (BTSI) devices are designed to act as an electro-mechanical locking mechanism for the transmission shift system. An associated actuator is electrically de-energized to lock the shift mechanism in the PARK position. The driver must apply the brake to energize the actuator prior to shifting out of park. The energized coil in the BTSI retracts an inhibit pin which allows the shifter to be moved from PARK to the other transmission positions.

The BTSI device also includes a park detection switch (PDS) which is a double-throw switch that contains a normally open set of contacts and a normally closed set of contacts. This switch gives shifter position status to the vehicle (and the instrument panel). When the switch is closed, it indicates that the column shifter is in the PARK position. When the switch is opened, it indicates that the shifter is located out of the PARK position. The status of the PDS switch is communicated to the vehicle electronics via a terminal/connector system. Although such designs gives the status of the shifter assembly position (via the PDS switch), it does not indicate the status of the inhibit pin in the BTSI device. As such, it gives no status of the inhibit pin position to the vehicle electronics. This may result in issues related to the vehicle operator not being able to shift the shift lever out of the park position (e.g., inhibit pin remaining extended) or allowing the shift lever to be shifted out of park position without placing the vehicle operator's foot on the brake (e.g., inhibit pin remaining retracted when power is removed from switch).

SUMMARY

According to one aspect of the disclosure, a steering column assembly includes a jacket assembly. The steering column assembly also includes a transmission shift assembly operatively connected to the jacket assembly. The steering column assembly further includes a brake transmission shift interlock (BTSI) device comprising an inhibitor pin translatable between an extended position and a retracted position, the inhibitor pin preventing shifting of the transmission shift assembly out of a PARK position when the inhibitor pin is in the extended position. The steering column assembly yet further includes an inhibitor pin monitoring system. The inhibitor pin monitoring system includes a sensor operatively coupled to a stationary portion of the BTSI device, relative to the inhibitor pin. The inhibitor pin monitoring system also includes a magnetic ring operatively fixed coupled to the inhibitor pin, the sensor detecting when the inhibitor pin is in the extended position.

According to another aspect of the disclosure, a brake transmission shift interlock (BTSI) inhibitor pin monitoring system for detecting a position of an inhibitor pin translatable between an extended position and a retracted position is provided. The inhibitor pin prevents shifting of a transmission shift assembly out of a PARK position when the inhibitor pin is in the extended position. The inhibitor pin monitoring system includes a sensor. The inhibitor pin monitoring system also includes a magnetic ring operatively fixed coupled to the inhibitor pin, the sensor positioned on a stationary portion of the BTSI to be axially aligned with the magnetic ring when the inhibitor pin is in the extended position. The inhibitor pin monitoring system further includes an electronic circuit in communication with the sensor to generate a signal when the magnetic ring is axially aligned with the sensor in the extended position.

These and other advantages and features will become more apparent from the following description taken in conjunction with the drawings.

BRIEF DESCRIPTION OF THE DRAWINGS

The subject matter that is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, various embodiments of the invention are described. It is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
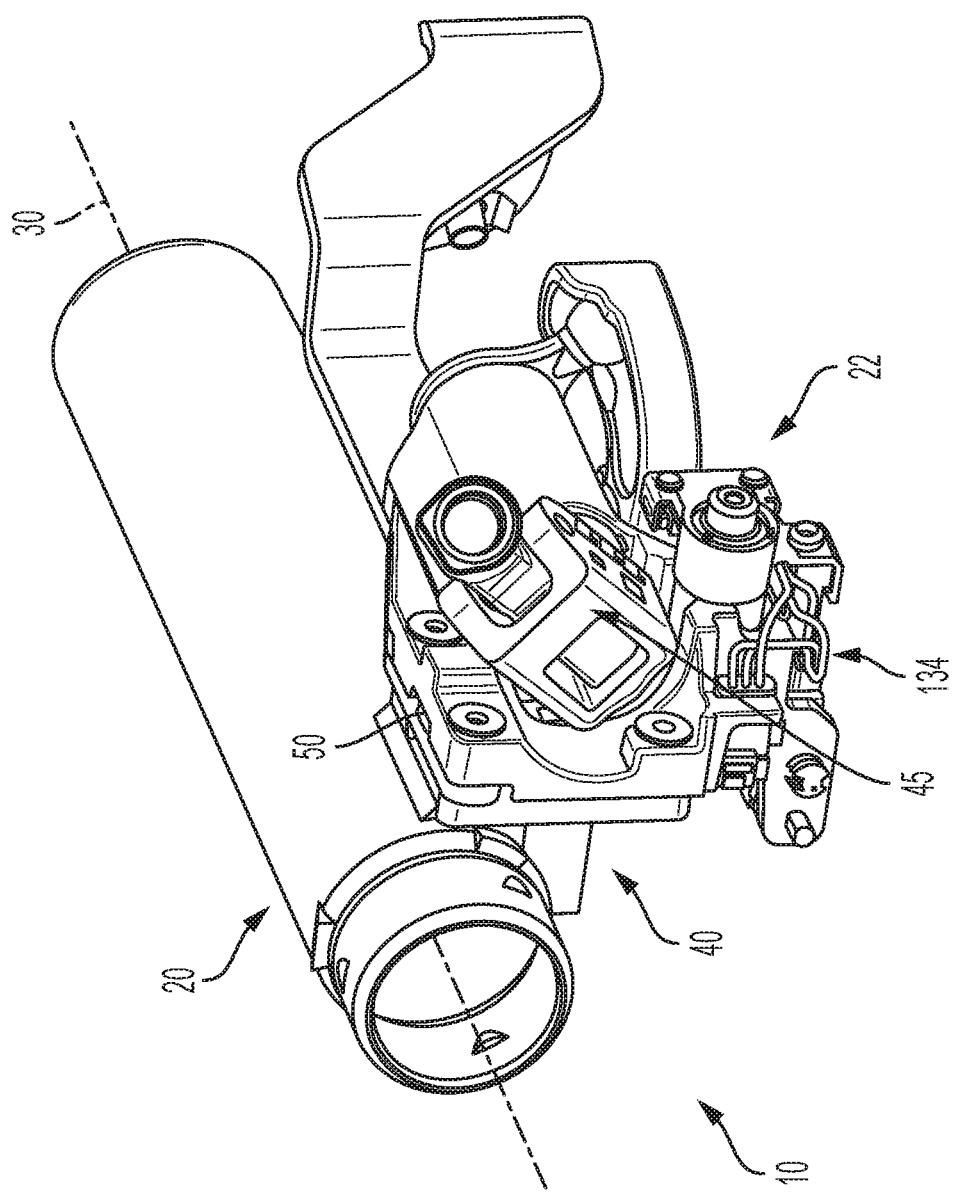
FIG. 1 is a perspective view of a steering column assembly.

Referring to FIG. 1, a steering column assembly 10 is illustrated. The steering column assembly 10 is an adjustable steering column assembly that may be telescopically adjustable along a longitudinal axis and may be tiltable about an axis that is disposed transverse to the longitudinal axis. The steering column assembly 10 includes a jacket assembly 20 and a shift assembly 22. The jacket assembly 20 extends along a first axis 30. The first axis 30 may be a longitudinal axis along which the jacket assembly 20 may telescope. The jacket assembly 20 is collapsible along the first axis 30 to absorb energy during an impact event. The jacket assembly 20 may also be tiltable or rake adjustable about the axis that is disposed transverse to the first axis 30.

The jacket assembly 20 may be disposed within a shroud assembly. The jacket assembly 20 is positioned within the shroud assembly and is spaced apart from, and does not engage, the shroud assembly even during a telescope operation, a tilt operation, or a collapse operation.

The shift assembly 22 is operatively connected to the jacket assembly 20. The shift assembly 22 is a low-profile shift assembly that is spaced apart from, and does not engage, the shroud assembly even during a telescope operation, a tilt operation, or collapse operation.

A mounting bracket 40 is disposed on the jacket assembly 20. The mounting bracket 40 may be joined to the jacket assembly 20 by a variety of methods including fastening, welding, or the like. The bracket 40 provides an interface for mounting of various features to the jacket assembly 20. For example, a gear shift mechanism 45 and a brake transmission shift interlock (BTSI) device 134 are provided and operatively coupled to the jacket assembly 20. The gear shift mechanism 45 allows a vehicle operator to manually shift between multiple operating conditions, such as Park, Reverse, Neutral, Drive, and Low (PRNDL). The BTSI device 134 physically impedes shifting out of the Park condition unless one other condition is met, such as depression of a brake pedal.

Figure 2:
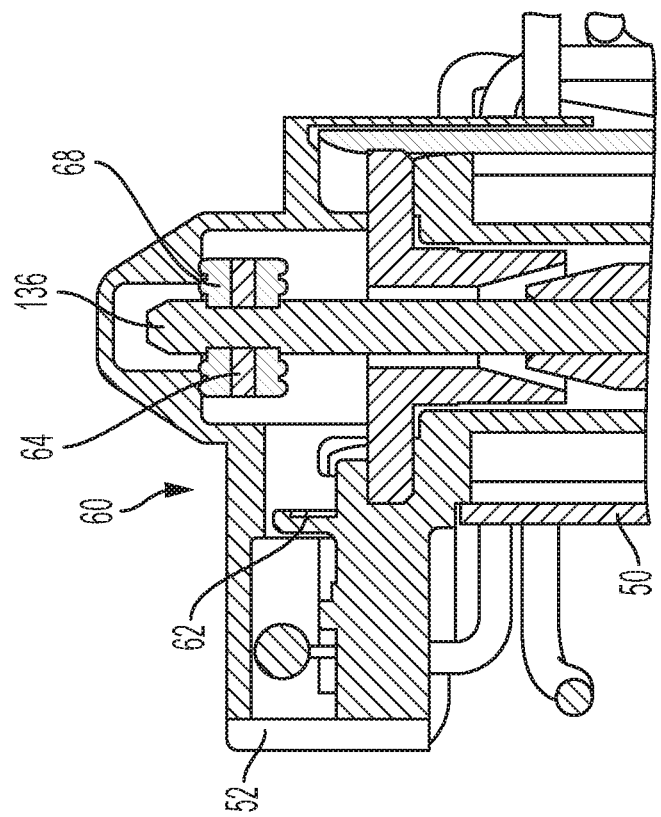
FIG. 2 is a cross-sectional view of a portion of a brake transmission shift interlock device in a first position.
Figure 3:
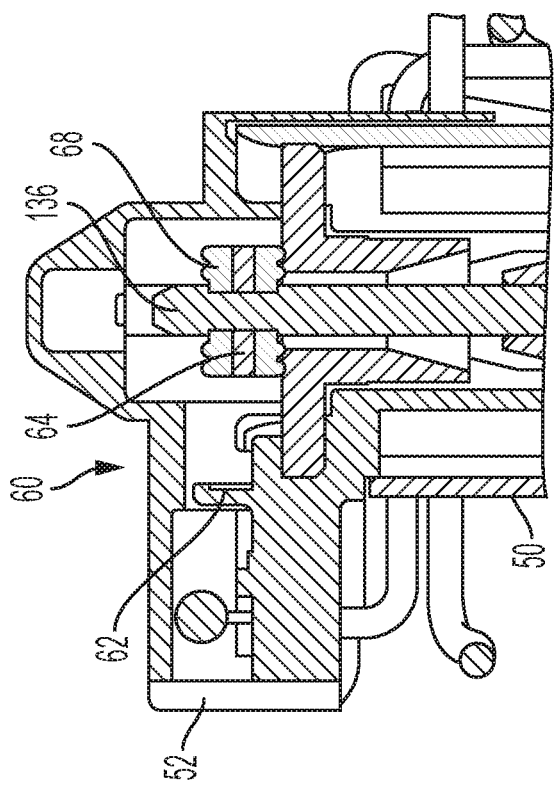
FIG. 3 is a cross-sectional view of a portion of the brake transmission shift interlock device in a second position.

Referring now to FIGS. 2 and 3, the BTSI device 134 includes an inhibitor pin 136 disposed within a BTSI housing 50. The inhibitor pin 136 is movable along the axis that is disposed substantially transverse to the first axis 30 between an extended position (FIG. 2) and a retracted position (FIG. 3). The retracted position of the inhibitor pin 136 permits the gear shift mechanism 45 to move out of a Park position. The extended position of the inhibitor pin 136 inhibits the gear shift mechanism 45 from moving out of the Park position. The inhibitor pin 136 moves between the extended position and the retracted position in response to activation of a braking system, such as depressing a brake pedal.

A BTSI inhibitor pin monitoring system is disclosed herein and referenced generally with numeral 60. The BTSI inhibitor pin monitoring system 60 ensures that the position (i.e., extended or retracted) of the inhibitor pin 136 is reliably known by a vehicle operating system. In other words, the position of the inhibitor pin 136 is directly monitored, rather than relying on other conditions of the overall shift assembly 22 to ensure proper functioning of the BTSI device 134.

The BTSI inhibitor pin monitoring system 60 includes a sensor 62 and a magnetic ring 64 disposed about a portion of the inhibitor pin 136. The sensor 62 may be a Hall effect sensor in some embodiments and is mounted to a stationary portion of the BTSI device 134. The mounting location of the sensor 62 may be any portion of the BTSI device 134 that is stationary relative to the inhibitor pin 136. For example, the sensor 62 may be mounted to an inner surface of the BTSI housing 50 or on an inner surface of a BTSI switch cover 52 that is located proximate an end of the BTSI housing 50. Regardless of the precise mounting location of the sensor 62, the sensor 62 is positioned to be disposed radially outward of, but in axial alignment with, the magnetic ring 64 that is operatively coupled to the inhibitor pin 136 when the inhibitor pin is in a first position (i.e., the extended position of FIG. 2), but not axially aligned when the inhibitor pin 136 is in a second position (i.e., the retracted position of FIG. 3).

While it is contemplated that the magnetic ring 64 may be directly coupled to the inhibitor pin 136 in some embodiments, in the illustrated embodiment the magnetic ring 64 is coupled to a bumper 68 that is fixed to the inhibitor ring 136. The bumper 68 is provided to dampen sound associated with movement of the inhibitor pin 136 during operation. The magnetic ring 64 may be disposed on an outer surface of the bumper 68 or may be fully or partially embedded within the bumper 68.

Figure 5:
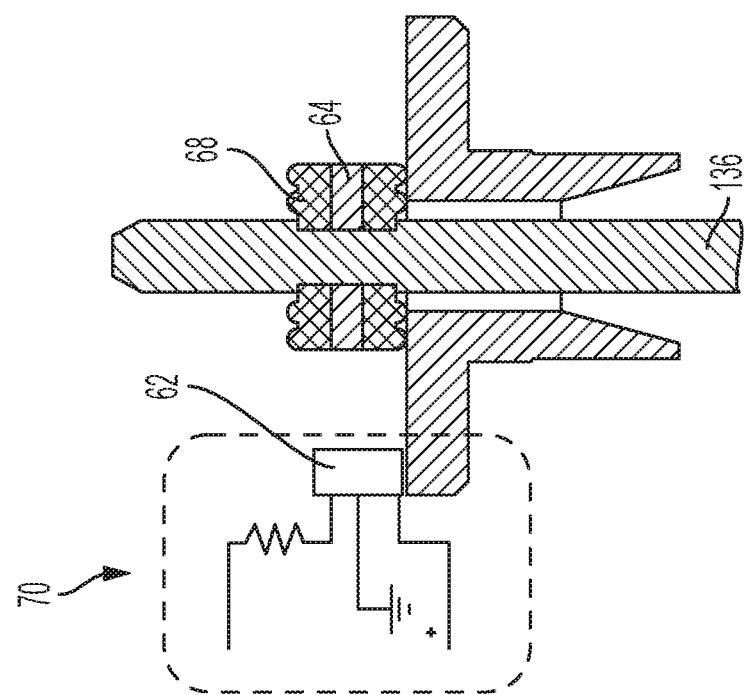
FIG. 5 is a schematic illustration of the sensor and the circuit.
Figure 4:
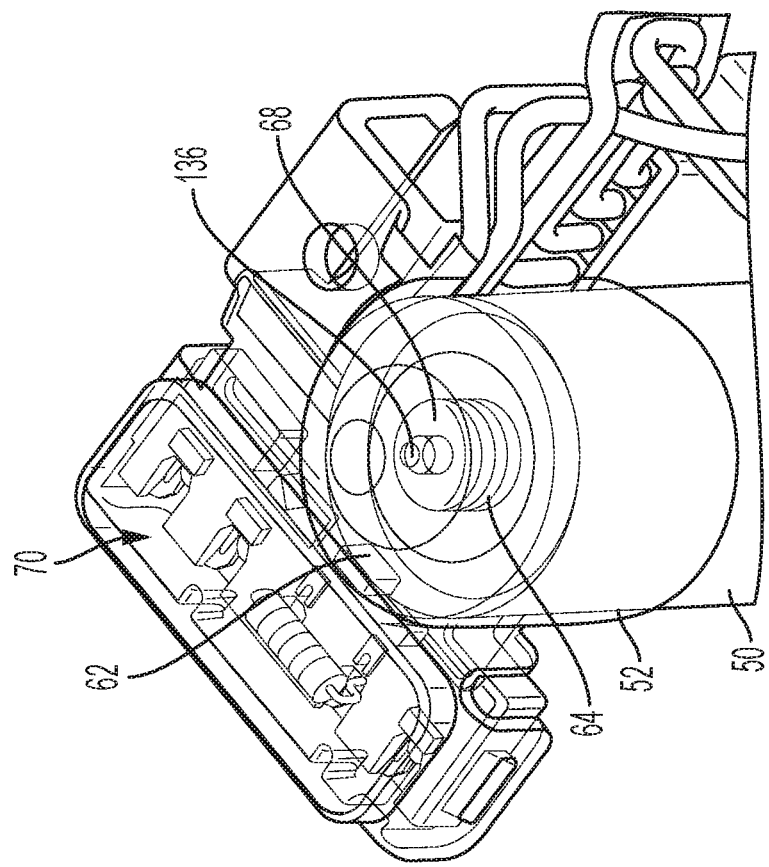
FIG. 4 is a perspective view of the brake transmission shift interlock device with a sensor and circuit for detecting a position of the brake transmission shift interlock device.

Referring now to FIGS. 4 and 5, the BTSI inhibitor pin monitoring system 60 is illustrated in additional detail. In particular, an electrical circuit 70 in communication with the sensor 62 is shown physically in FIG. 4 and schematically in FIG. 5. The circuit is configured to receive a signal when the inhibitor pin 136 is detected to be in the extended position of FIG. 2, such that the magnetic ring 64 is close enough in proximity (i.e., axially aligned) to the sensor 62. In the event the inhibitor pin 136 remains in the extended position of FIG. 2 when the shift mechanism 45 is in the Park position and the brake pedal is depressed, the signal indicates that a "won't shift out of park" condition exists.

When the magnetic ring 64 is not close enough in proximity to the sensor 62, no signal is generated by the circuit 70, which is indicative of the inhibitor pin 136 being in the retracted position of FIG. 3. The "no signal" condition indicates that the inhibit pin 136 has remained in the retracted position and a "pull out of park" condition exists. When the brake pedal is not depressed and this condition is present when the shift mechanism 45 is in Park, this condition indicates that the inhibitor pin 136 has been inadvertently held and/or purposely overridden in the retracted position of FIG. 3.

Either of the above-described undesirable conditions (i.e., won't shift out of park or pull out of park) leads to a respective warning generated by the vehicle electronics/diagnostics system. Measures can be taken to prevent safety issues arising as a result of pulling the shift lever out of the Park position without the vehicle operator applying the brake prior to shifting and to prevent customer dissatisfaction issues arising as a result of applying the brake prior to shifting, and then having the shift lever not able to be pulled out of the Park position. Although prior BTSI devices include position detection sensors for a BTSI switch, the embodiments disclosed herein beneficially indicate the actual position of the inhibitor pin 136.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering column assembly, comprising:
   a jacket assembly;
   a transmission shift assembly operatively connected to the jacket assembly;
   a brake transmission shift interlock (BTSI) device comprising an inhibitor pin translatable between an extended position and a retracted position, the inhibitor pin preventing shifting of the transmission shift assembly out of a PARK position when the inhibitor pin is in the extended position; and
   an inhibitor pin monitoring system comprising:
      a sensor operatively coupled to a stationary portion of the BTSI device, relative to the inhibitor pin;
      a bumper operatively coupled to the inhibitor pin; and
      a magnetic ring operatively coupled to the bumper, wherein the bumper and the magnetic ring are separate, independent components, the sensor detecting when the inhibitor pin is in the extended position.

2. The steering column assembly of claim 1, wherein the sensor is coupled to an inner wall of a housing of the BTSI device.

3. The steering column assembly of claim 1, wherein the sensor is coupled to an inner wall of a switch cover of the BTSI device.

4. The steering column assembly of claim 1, wherein the sensor is a Hall effect sensor.

5. The steering column assembly of claim 1, wherein the magnetic ring is at least partially embedded within the bumper.

6. The steering column assembly of claim 1, wherein the magnetic ring is disposed on an outer surface of the bumper.

7. The steering column assembly of claim 1, wherein the inhibitor pin monitoring system further comprises an electronic circuit in communication with the sensor to generate a signal when the magnetic ring is axially aligned with the sensor in the extended position.

8. The steering column assembly of claim 7, wherein the electronic circuit is in communication with a vehicle electronics and diagnostics system.

9. The steering column assembly of claim 8, wherein the vehicle electronics and diagnostics system is configured to generate a first warning when the inhibitor pin is stuck in the extended position and a second warning when the inhibitor pin is inadvertently held and/or purposely overridden in the retracted position.

10. A brake transmission shift interlock (BTSI) inhibitor pin monitoring system for detecting a position of an inhibitor pin translatable between an extended position and a retracted position, the inhibitor pin preventing shifting of a transmission shift assembly out of a PARK position when the inhibitor pin is in the extended position, the inhibitor pin monitoring system comprising:
   a sensor;
   a bumper operatively coupled to the inhibitor pin; and
   a magnetic ring operatively coupled to the bumper, wherein the bumper and the magnetic ring are separate, independent components, the sensor positioned on a stationary portion of the BTSI to be axially aligned with the magnetic ring when the inhibitor pin is in the extended position; and
   an electronic circuit in communication with the sensor to generate a signal when the magnetic ring is axially aligned with the sensor in the extended position.

11. The inhibitor pin monitoring system of claim 10, wherein the sensor is coupled to an inner wall of a housing of the BTSI.

12. The inhibitor pin monitoring system of claim 10, wherein the sensor is coupled to an inner wall of a switch cover of the BTSI.

13. The inhibitor pin monitoring system of claim 10, wherein the sensor is a Hall effect sensor.

14. The inhibitor pin monitoring system of claim 10, wherein the magnetic ring is at least partially embedded within the bumper.

15. The inhibitor pin monitoring system of claim 10, wherein the magnetic ring is disposed on an outer surface of the bumper.

* * * * *